United States Patent [19]

Miericke et al.

[11] 3,937,150
[45] Feb. 10, 1976

[54] MAGNET SYSTEM FOR USE IN ELECTRODYNAMICLY SUSPENDED VEHICLES

[75] Inventors: Jürgen Miericke, Nurnberg; Laxmikant Urankar, Erlangen, both of Germany

[73] Assignee: Siemens Aktiengesellschaft, Munich, Germany

[22] Filed: Jan. 30, 1975

[21] Appl. No.: 545,594

[52] U.S. Cl. ............................ 104/148 SS
[51] Int. Cl.² ............................ B61B 13/08
[58] Field of Search ...104/148 MS, 148 SS, 148 LM, 104/148 R; 335/216, 219, 217

[56] References Cited
UNITED STATES PATENTS

| | | | |
|---|---|---|---|
| 3,470,828 | 10/1969 | Powell, Jr. et al. | 104/148 SS |
| 3,717,103 | 2/1973 | Guderjahn | 104/148 SS |
| 3,842,751 | 10/1974 | Thornton et al. | 104/148 SS |

*Primary Examiner*—Trygve M. Blix
*Assistant Examiner*—Paul E. Sauberer
*Attorney, Agent, or Firm*—Kenyon & Kenyon Reilly Carr & Chapin

[57] ABSTRACT

An improved magnet system for use in electrodynamic vehicle suspension and guidance systems in which a vehicle moves along a track maintained in the suspended condition through the use of a plurality of magnets attached to the vehicle and arranged one behind the other in the direction of travel, the vehicle magnets cooperating with the means on the roadbed to generate the necessary forces to maintain suspension, in which means are provided to change the polarity of two respective adjacent magnets as a function of vehicle velocity and to control the spacing of said adjacent magnet in order to reduce braking losses particularly at high vehicle velocities.

11 Claims, 8 Drawing Figures

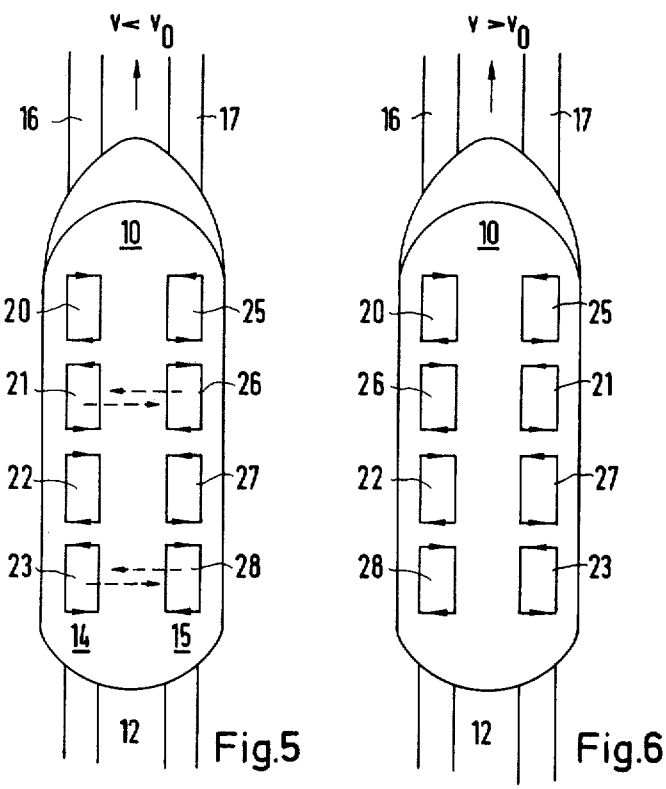
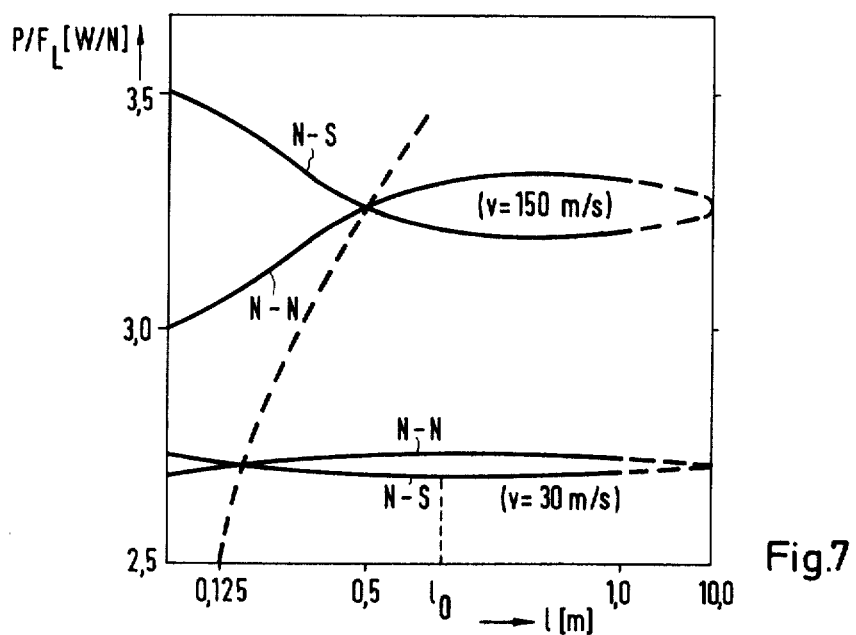

MAGNET SYSTEM FOR USE IN ELECTRODYNAMICLY SUSPENDED VEHICLES

BACKGROUND OF THE INVENTION

This invention relates to magnetically suspended vehicles in general and more particularly to an improved magnetic system for use in such vehicles, which magnetic system reduces braking losses.

Various systems have been developed for the contactless magnetic suspension and guidance of vehicles. Vehicles of this nature are being designed to reach speeds of over 300 km/hr. Basically two different types of guidance principles are known and use in such systems. In one of these, referred to as the "electromagnetic" guidance principle, magnetic attractive forces are used. In such a system forces between electromagnets attached to both sides of the vehicle and ferromagnetic rail members on the track line are used to generate the necessary forces. In such a system the excitation of the electromagnets must be controllable so that their distance from the rail members can be maintained approximately constant. Another system, which does not require such control, utilizes what is referred to as the "electrodynamic" guidance principle. In such a system magnetic repulsion forces produced by the interaction of magnets attached to the vehicle moving over highly conductive but nonferromagnetic rails or slabs and inducing eddy currents therein are utilized. However, the required field strength of the generally uncontrolled electromagnets used in such an electrodynamic system is quite a bit larger than that of electromagnets used in electromagnetic guidance systems. Because of this the use of super-conducting magnets becomes particularly advantageous particularly since their weight is small compared to that of corresponding normally conducting magnets.

A number of embodiments of electrodynamic suspension and guidance arrangements are known and are disclosed in U.S. Pat. No. 3,470,828. Typically these include a plurality of vehicle magnetic loops arranged on both sides of the vehicle one behind the other in the direction of travel. These vehicle magnet loops interact with corresponding track loops or rails. Individual magnet loops associated with vehicles are elongated and of an approximately rectangular shape so that their end faces situated next to each other can be brought close together. Super-conducting magnets with an elongated coil structure in the travel direction and which are rectangular or only slightly rounded at their end faces are preferably employed as disclosed in U.S. Pat. No. 3,717,103. This design follows from the theory of electrodynamic suspension above a conducting plate. According to this theory the ratio of the lifting force developed to the braking force of such a system is particularly favorable for elongated magnets particularly at high operating velocity, such as velocities in the vicinity of 500 km/hr. Small magnets on the other hand produce a strong skin effect, i.e., when small magnets are used the currents which are necessary in the conducting track loops or rails to develop the necessary lifting forces, at these speeds, are strongly directed from the interior of the track to the track surface and thereby produce larger braking losses.

Furthermore, as taught in the above noted U.S. Pat. No. 3,470,828 it is particularly advantageous if the polarity of each two magnets arranged one behind the other in the travel direction and adjacent to each other is different. Such an alternating polarity results in a large magnetic field gradient between each two magnets and leads to large lifting forces.

However, despite these various measures, as the vehicle velocity increases, braking forces increase. In view of this, the need for an improved system which has lower braking losses at high vehicle velocities becomes evident.

SUMMARY OF THE INVENTION

The present invention is based on the discovery that the polarity, along with the distance, between each two adjacent magnets has a strong influence on the suspension behavior as a function of vehicle velocity. Such dependence on a velocity can be partially explained by the characteristic ratio of the time constants of the track current to the passing time of the magnets along with skin effect considerations. More specifically, the present invention, making use of this knowledge, provides a system in which the polarity of adjacent magnets can be changed from a condition where adjacent magnets have the opposite polarity to one where adjacent magnets have the same polarity. By so doing braking losses can be reduced, particularly at high velocities. In accordance with the present invention it is preferable that the polarity of magnets be changed as a function of velocity of the vehicle to achieve optimum operation at all velocities.

In accordance with a further feature of the present invention, the spacing between adjacent magnets is variable. This permits further reducing the braking losses of the electrodynamic guidance system. In general then, the magnet system of the present invention is preferably designed so that both the polarity and spacing is a function of vehicle velocity. As disclosed the system can be operated so that at velocities below a predetermined velocity adjacent individual magnets will have different polarities and will be at a predetermined spacing. At approximately the predetermined velocity, a change of polarity of the individual magnets is carried out so that all magnets have the same polarity and thereafter the spacing of the magnets is reduced as speed increases.

BRIEF DESCRIPTION OF THE DRAWINGS

FIGS. 5 and 6 are plan schematic views for operation above and below predetermined velocity respectively.

FIG. 7 is a curve illustrating the relationship between braking losses and magnet spacing for different velocities.

A DETAILED DESCRIPTION OF THE PREFERRED EMBODIMENT

Figure 1:
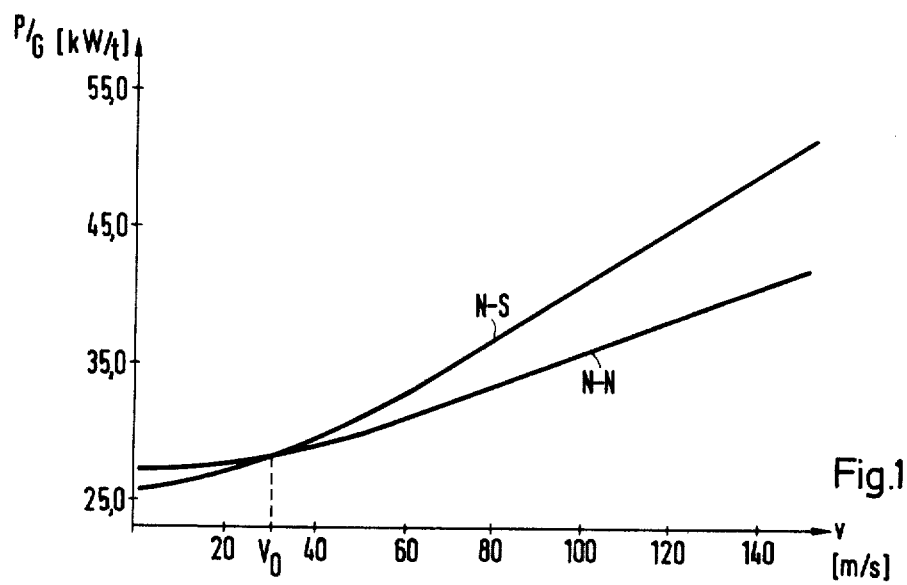
FIG. 1 is a curve illustrating the relationship between vehicle velocity and braking losses as a function of magnet polarity.
Figure 2:
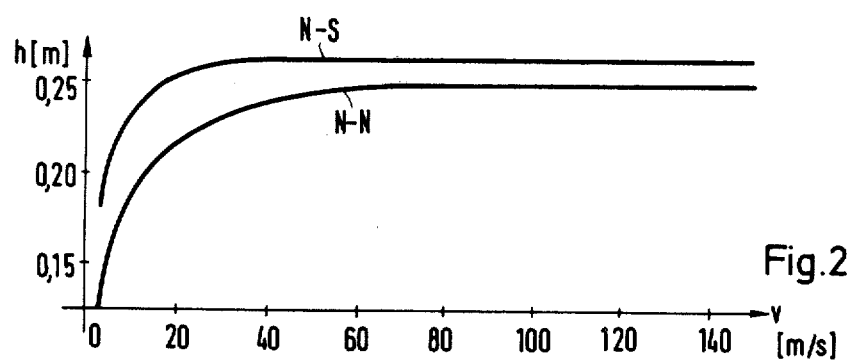
FIG. 2 is a curve illustrating the relationship between suspension height and vehicle velocity as a function of magnet polarity.

FIG. 1 illustrates the relationship between vehicle velocity and braking losses for different magnet polarities and FIG. 2 the relationship between suspension height and vehicle velocity for different magnet polarities. The calculations on which these figures are based assume two approximately rectangular individual magnets arranged one behind the other in the travel directions having cross-sections parallel to the plane of the track with their major axes in the travel direction. Each is assumed to be approximately 0.5m long and 0.3m wide. The spacing of their end faces facing each other is approximately 0.25m. The two individual magnets form a normal-flux system with an aluminum rail of approximately 2.0 cm thickness, over which they are guided at a velocity $v$. Assumed continuous current in the magnets is $3 \times 10^5$ ampere-turns. One and a half tons is assumed as the vehicle weight G, which the magnetic field generated by the two individual magnets must support.

Based on this assumed arrangement, the losses P per vehicle weight G are given on FIG. 1 as a function of the vehicle velocity $v$. The losses P are the product of the braking force occurring in the normal-flux system and the velocity $v$ and are generally measured in kilowatts. The curve designated as N—N is for the case where the two individual magnets have the same polarity, i.e., when the operating currents I have the same direction of circulation. The curve designated N-S is for the system with two magnets having opposite polarities. Thus, in these magnets current flow with opposite direction of circulation.

Because with a system such as this the braking losses resulting from the polarity of magnets one behind the other must be overcome by the propulsion drive of the vehicle with which they are associated, it is advantageous to keep the losses as low as possible. From the figure it is evident that at lower velocities up to a velocity of $v_o$ of about 30 m/s, adjacent magnets with opposite polarity result in lower braking losses. At the point $v_o$, the two curves cross and at greater velocities braking losses are lower with adjacent magnets of the same polarity. From the figure the difference in braking losses at low velocities is quite small and it might, from this information alone, be considered advantageous to use magnets of opposite polarities at all times. However, reference to FIG. 2 will show why such is not desirable. On that figure the suspension height as a function of vehicle velocity for both the magnets of the same polarity, indicated by the curve N—N and opposite polarity, indicated by the curve N-S are shown. Examination of this figure shows that with magnets of the same polarity, at low speeds, the suspension height maintained is inadequate. Only with the opposite polarity arrangement of the curve N-S will sufficient suspension height be maintained at low speed. Thus, at lower speeds the opposite polarity arrangement is necessary. However, past the velocity $v_o$, the difference in suspension height becomes minimal and the governing factor is the braking losses. As a result the system of the present invention provides the capability of switching over from a system having adjacent magnets at opposite polarity to one where all magnets are at the same polarity. In accordance with FIG. 1 for the described system, such switch-over should take place at approximately the velocity $v_o$.

The example given is for two magnets. Normally larger systems will have a multiplicity of individual magnets arranged one behind the other. Such a system will have a curve similar to that of FIG. 1 but differing in its exact form and the exact velocity $v_o$. In a larger system such as this, the switch over from a situation of opposite polarity to one of the same polarity may be done gradually; for example, by initially reversing the polarity of every second or third magnet which must be switched and then in a further step reversing the polarity of the remaining magnets.

Figure 3:
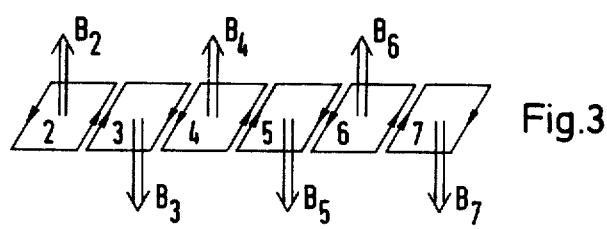
FIGS. 3 and 4 are schematic illustrations of operation at low and high velocities respectively.
Figure 4:
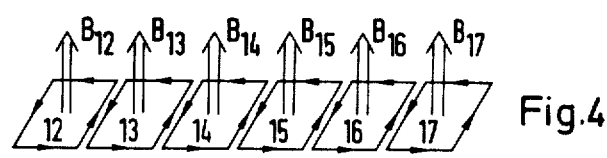

FIGS. 3 and 4 illustrate, in schematic form, magnets configured for low velocity operation and high velocity operation respectively. In FIG. 3 the current flow directions of six individual magnets, arranged one behind the other in the travel direction of the vehicle, are shown for low vehicle velocities i.e., for velocity $v > v_o$. The six magnets are schematically illustrated by loops 2 to 7 with currents flowing therein. Adjacent magnets carry currents of different direction so that alternating polarities of associated magnetic fields $B_2$ through $B_7$ are developed. These fields are shown by double arrows pointing upward and downward in a direction normal to the surface enclosed by the current loops.

For high velocities where the velocity $v$ is greater than $v_o$ current flow directions such as that shown in FIG. 4 are used. The individual magnets which will correspond to those of FIG. 3 are represented by the loops 12 through 17 of the current flowing therein. The flow direction of all currents is the same so that the magnetic fields indicated by the double arrows $B_{12}$ through $B_{17}$ associated with these magnets all point in the same direction.

FIGS. 5 and 6 are schematic plan views of a vehicle having a magnet system such as that of the present invention installed. FIG. 5 illustrates the system configuration for travel where $v$ is less than $v_o$ and FIG. 6 for the condition where $v$ is greater than $v_o$. In each case, two magnet systems, designated 14 and 15, one provided on each side of the vehicle, are installed attached to the vehicle. The magnets 20 through 23 are arranged along one side of the vehicle to form the system 14 and the magnets 25 through 28 along the other side to form the system 15. The magnet systems 14 and 15 cooperate respectively with the reaction rails 16 and 17 arranged horizontally on the track 12. These reaction rails 16 and 17 may comprise aluminum slabs. As illustrated the magnets are of rectangular cross-sections, preferably super-conducting magnets and will induce eddy currents in the reaction rails 16 and 17 to generate the necessary lifting forces. Associated with the vehicle will be a curve such as that of FIG. 1. At a velocity below $v_o$ on that curve the configuration will be as in FIG. 5, i.e., the adjacent magnets one behind the other will have opposite polarities. However, once the point $v_o$ is crossed, the configuration will be changed to that of FIG. 6 with all magnets in one system having the same polarity. This change in polarity can be carried out in a number of different ways. FIG. 5 schematically illustrates the possibility of switching the magnets 21 and 26 and 23 and 28 by movement in the direction of the dotted arrows to go from the configuration of FIG. 5 to that of FIG. 6. In addition, the polarity can also be changed by means of a switch reversing the poles of the corresponding magnets, i.e., the magnets 21, 23, 26, and 28.

In addition to the effect which the polarity of the individual magnets has on braking losses there is also an effect resulting from the spacing of the magnets. The length of the magnets, the polarities, the vehicle velocity and the track parameters such as the thickness or conductivity of the rails are all interrelated with each other in a complicated manner. Thus in a vehicle it is advisable to make the magnet length and track parameters fixed but to permit the polarity and mutual spacing of the magnets be variable within a certain range. FIG. 7 is a diagram illustrating the dependence of the specific braking losses P per lifting force $F_L$ in a normal-flux system on the distance 1 between the end faces of two adjacent individual magnets arranged one behind the other. To prepare the curves of FIG. 7 the parameters associated with FIGS. 1 and 2 were used. The two upper curves illustrate the braking losses at a vehicle velocity $v = 150$ m/sec and the two lower curves a vehicle velocity $v = 30$ m/sec. Again the curves designated N—N represent a configuration such as that of FIG. 6 where all magnets have the same polarity and the curve N-S a configuration such as in FIG. 5 where adjacent magnets have opposite polarity. The intersections of the two lines lies on a curve shown in doted lines and whose parameter is the velocity $v$. From this curve it can be seen that in addition to changing the polarity of the individual magnets as a function of vehicle velocity in accordance with FIGS. 1 and 2, braking losses can further be reduced by changing the spacing 1 between adjacent magnets. As is evident from the figure, at higher velocities, with the same polarity in all magnets, spacing should be as small as possible. At lower velocities and alternating polarity, a certain distance indicated on the figure as $l_o$ will result in minimum braking losses. At it can be seen from FIG. 1 once the velocity $v_o$ is passed, only a small gradual increase in braking losses will occur after switching polarities. This small increase can be almost completely made up as velocity increases through a decreasing of the spacing between magnets. Thus, by both adapting the magnet so that their polarity can be changed and so that their spacing can be controlled it is possible to materially reduce braking losses.

Figure 8:
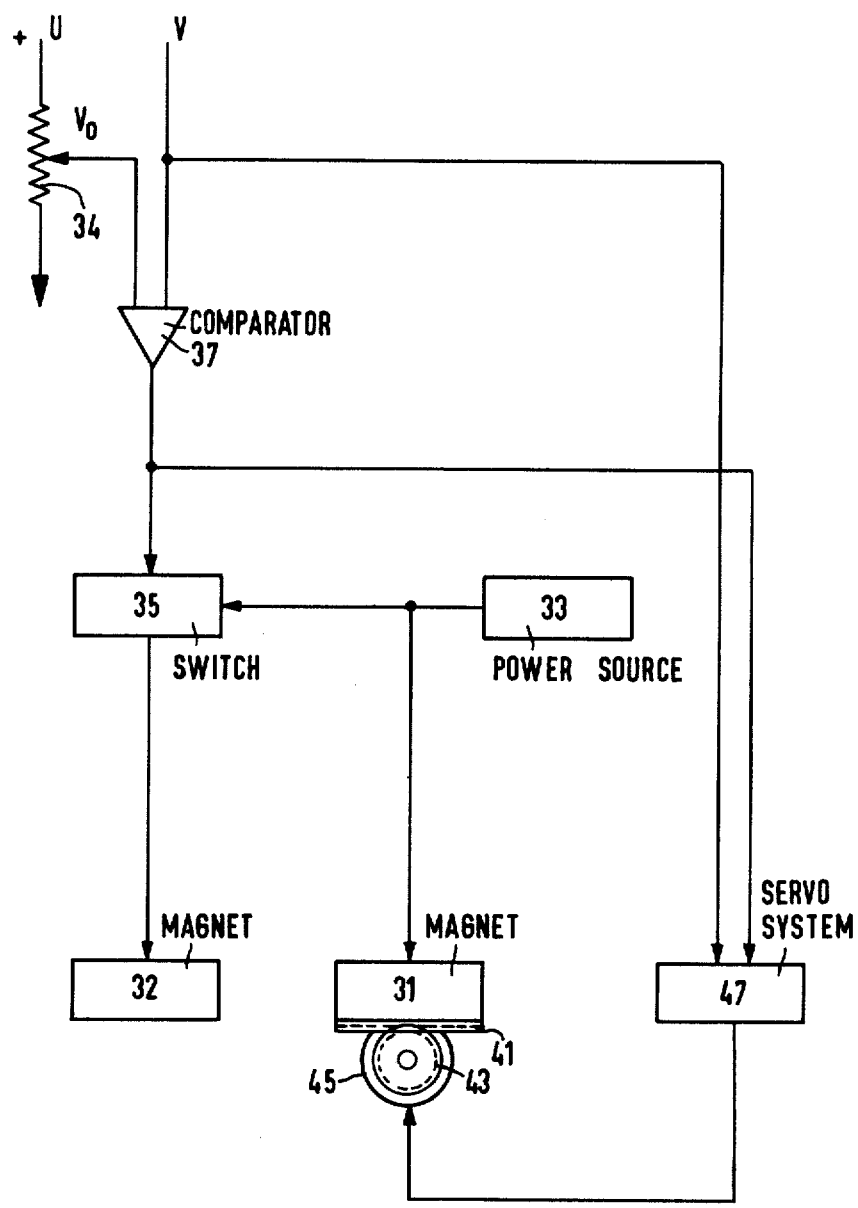
FIG. 8 illustrates, in block diagram form, the system of the present invention for changing polarity and magnet spacing.

FIG. 8 illustrates a embodiment for implementing the present invention. Shown are two magnets 31 and 32. These correspond, for example, to the magnets 20 and 21 of FIGS. 5 and 6. Both magnets are energized from a power source 33, the magnet 31 directly and the magnet 32 through a polarity reversing switch 35. Provided is a comparator 37 having, as reference input from a potentiometer 34 or the like, a reference value representing the precomputed velocity $v_o$. The actual value input to the comparator is the velocity $v$ obtained from the vehicle speedometer or some similar source. When the velocity $v$ exceeds the velocity $v_o$ an output from the comparator 37 will be provided to activate the switch 35 to change the polarity of magnet 32.

As illustrated, magnet 31 is supported for lateral movement with respect to the magnet 32. Schematically illustrated is a rack 41 attached to the magnet which is driven by a pinion 43 on a motor 45. A second input from the comparator 37 is used to enable a servo system 37 having as a reference input the velocity $v$. Servo system 47 will operate in conventional fashion causing motor 45 to drive the magnet 31 toward the magnet 32 as a function of velocity.

In general terms a plurality of magnet systems in a vehicle can be advantageously operated during the starting or accelerating phase in manner such that in the velocity range below the predetermined velocity $v_o$ adjacent magnets of the magnet system have different polarities and are arranged at a spacing $l_o$. As velocity increases to, for example, velocity $v_o$ the polarity of the individual magnets is changed so that all adjacent magnets have the same polarity and thereafter the spacing of the magnets is reduced. When slowing of the vehicle takes place the process can and will proceed in the reverse manner.

In the illustrated example an electrodynamic normal-flux system has been used. The behavior of other electrodynamic guidance systems is similar and the present invention can be used therewith. As is well known typically magnet systems are used both for suspension and/or lateral guidance. Thus, the present invention can also be applied to magnet systems used for the lateral guidance of suspended vehicles. Typical of such systems in which suspension and lateral guidance systems are combined are those disclosed for example in German Pat. Nos. 2,160,666 and 2,160,680.

Thus, an improved magnet system for use in an electrodynamic vehicle suspension and guidance system has been shown. Although specific embodiments have been illustrated and described, it will be obvious to those skilled in the art that various modifications may be made without departing from the spirit of the invention which is intended to be limited solely by the appended claims.

We claim:

1. In a magnet system for the contactless guidance of a vehicle moved along a track in which a plurality of magnets are attached to the vehicle and arranged one behind the other in the direction of travel, the magnet system cooperating with nonferromagnetic conductor loops on the track to generate forces according to the electrodynamic principle, the improvement comprising means to change the polarity of an adjacent magnet from a condition where two adjacent magnets have opposite polarities to one where they both have the same polarity.

2. A magnet system according to claim 1 wherein said means for changing polarity are responsive to the vehicle velocity.

3. A magnet system according to claim 2 wherein said means for changing polarity include means to compare actual vehicle velocity with a predetermined velocity and to change the polarity, when said predetermined velocity is exceeded, from a condition in which adjacent magnets have opposite polarity to one in which adjacent magnets have the same polarity.

4. A magnet system according to claim 3 and further including means for controlling the spacing of adjacent magnets.

5. A magnet system according to claim 4 wherein said means control said spacing so as to reduce said spacing as a function of velocity after said predetermined velocity is exceeded.

6. A magnet system according to claim 1 and further including means for controlling the spacing of adjacent magnets.

7. A magnet system according to claim 6 wherein said means include means responsive to velocity to change said spacing as a function thereof.

8. In a magnetic system for the contactless guidance of a vehicle moved along a track in which a plurality of magnets are attached to the vehicle and arranged one behind the other in the direction of travel, the magnet system cooperating with nonferromagnetic conductor loops on the track to generate forces according to the electrodynamic principle, the improvement comprising means to control the spacing between adjacent magnets.

9. The magnet system according to claim 8 wherein said means to control spacing are responsive to an input representing actual vehicle velocity.

10. A method of operating a magnet system used for the contactless guidance of a vehicle moved along a track, the vehicle having a plurality of magnets connected thereto which cooperate with reaction rails on the roadbed to generate guidance forces, the magnets being arranged one behind the other in the direction of travel comprising the steps of:

a. energizing adjacent magnets arranged one behind the other such that adjacent magnets have opposite polarities for velocities below a predetermined velocity with adjacent magnets at a predetermined spacing;

b. at a velocity approximately equal to said predetermined velocity changing the polarity of individual magnets so that adjacent magnets all have the same polarity; and c. decreasing the spacing between adjacent magnets as the vehicle velocity increases further above said predetermined velocity.

11. The method according to claim 10 wherein two parallel rows of magnets arranged one behind the other are provided and wherein said polarity change is carried out by mechanically interchanging individual magnets in one row with corresponding magnets of the other row.

* * * * *

UNITED STATES PATENT AND TRADEMARK OFFICE
CERTIFICATE OF CORRECTION

PATENT NO. : 3 937 150
DATED : February 10, 1976
INVENTOR(S) : Jürgen Miericke et al It is certified that error appears in the above-identified patent and that said Letters Patent are hereby corrected as shown below:

On page 1 between numbers [21] and [52] insert the following:

--[30] Foreign Application Priority Data

February 7, 1974 Germany.......2405850--

Signed and Sealed this

Twentieth Day of July 1976

[SEAL]

Attest:

RUTH C. MASON
*Attesting Officer*

C. MARSHALL DANN
*Commissioner of Patents and Trademarks*